United States Patent
Cypher

(10) Patent No.: US 7,373,480 B2
(45) Date of Patent: *May 13, 2008

(54) APPARATUS AND METHOD FOR DETERMINING STACK DISTANCE OF RUNNING SOFTWARE FOR ESTIMATING CACHE MISS RATES BASED UPON CONTENTS OF A HASH TABLE

(75) Inventor: Robert E. Cypher, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/281,733

(22) Filed: Nov. 16, 2005

(65) Prior Publication Data

US 2006/0107024 A1    May 18, 2006

Related U.S. Application Data

(60) Provisional application No. 60/629,118, filed on Nov. 18, 2004.

(51) Int. Cl.
    *G06F 12/00* (2006.01)
(52) U.S. Cl. .................. 711/216; 711/133; 711/159; 711/220; 711/221; 711/217; 711/118
(58) Field of Classification Search ............. 711/216, 711/118, 133, 159, 220, 221, 217; 703/14, 703/13, 17, 21; 717/128
    See application file for complete search history.

(56) References Cited

U.S. PATENT DOCUMENTS

| | | | |
|---|---|---|---|
| 5,442,571 A | | 8/1995 | Sites |
| 5,452,440 A | * | 9/1995 | Salsburg ................. 711/136 |
| 5,493,660 A | * | 2/1996 | DeLano et al. ........... 711/206 |
| 5,577,227 A | | 11/1996 | Finnell et al. |
| 5,603,004 A | | 2/1997 | Kurpanek et al. |
| 5,627,994 A | * | 5/1997 | Levy et al. ............... 711/150 |
| 6,002,875 A | | 12/1999 | Stolberg |
| 6,275,903 B1 | | 8/2001 | Koppala et al. |
| 6,282,613 B1 | * | 8/2001 | Hsu et al. ............... 711/118 |
| 6,826,668 B1 | | 11/2004 | Hsu et al. |
| 6,892,173 B1 | * | 5/2005 | Gaither et al. ........... 703/20 |
| 6,952,664 B1 | * | 10/2005 | Lahiri et al. ............ 703/14 |
| 2003/0196026 A1 | | 10/2003 | Moyer |
| 2004/0239680 A1 | | 12/2004 | Emberling |
| 2004/0260517 A1 | * | 12/2004 | Ding et al. .............. 702/186 |
| 2005/0071564 A1 | | 3/2005 | Luick |
| 2006/0059311 A1 | | 3/2006 | Van De Waerdt et al. |
| 2006/0107025 A1 | | 5/2006 | Cypher |

OTHER PUBLICATIONS

U.S. Appl. No. 10/985,525, filed Nov. 2004, Cypher.
U.S. Appl. No. 10/985,525, filed Nov. 2004, Robert E. Cypher.

* cited by examiner

*Primary Examiner*—Hong Kim
(74) *Attorney, Agent, or Firm*—Meyertons Hood Kivlin Kowert & Goetzel, P.C.; B. Noël Kivlin

(57) ABSTRACT

A method and apparatus for determining a stack distance histogram for running software. The method may include receiving a plurality of memory references each including a corresponding address. The method may also include performing a first hash function and a second hash function on each received address. In addition, the method may include selectively storing an indication representative of each corresponding address in a hash table dependent upon results of the first hash function and the second hash function. A stack distance may then be determined based upon contents of the hash table.

20 Claims, 5 Drawing Sheets

APPARATUS AND METHOD FOR DETERMINING STACK DISTANCE OF RUNNING SOFTWARE FOR ESTIMATING CACHE MISS RATES BASED UPON CONTENTS OF A HASH TABLE

PRIORITY CLAIM

This application claims the benefit of U.S. provisional patent application Ser. No. 60/629,118, titled "Mechanism and Method for Determining Stack Distance of Running Application Software for Monitoring Performance of a Cache Memory System", filed Nov. 18, 2004.

BACKGROUND OF THE INVENTION

1. Field of the Invention

This invention relates to cache memory systems and, more particularly, to a mechanism for determining a stack distance histogram of running software for estimating cache miss rates.

2. Description of the Related Art

Cache hit rates have a major impact on processor and computer performance. As a result, the ability to predict cache miss rates accurately is fundamental to both selecting the correct cache organization of a new computer and predicting the performance of that computer. Modern simulation technologies may allow the creation of accurate memory reference traces containing tens of billions of references. There are two main ways in which such memory reference traces can be used to estimate cache hit rates, namely cache simulation and analytical cache models.

Cache simulation provides a memory reference trace as input to the simulation of a specific cache organization or set of cache organizations. Cache simulation has the advantages of providing exact hit rates for a given cache organization and the ability to model arbitrarily complex cache organizations and hierarchies.

However, there may also be disadvantages to using cache simulation. Specifically, cache simulations that use long memory reference traces can be very time consuming, and as a result, they may often be applied to only a small set of possible cache organizations. Another disadvantage of cache simulation may be the lack of insight that the simulations provide into the inherent properties of the reference trace. While the miss rate for a given cache organization may be understood to have some relationship to the reference trace's temporal and spatial locality, the temporal and spatial locality of the trace can only be estimated in a vague and qualitative manner from the cache miss rate.

Although simulation may provide an exact cache miss rate for the given reference trace on the given cache organization, the simulated cache miss rate may not be the best possible estimate of the actual cache miss rate in a future system. For example, cache simulations typically do not provide cold miss rates, since most performance issues are concerned with steady-state, fully-warmed caches. As a result, the error introduced by excessive cold misses is typically not quantified with cache simulations. In addition, the simulated cache miss rate depends on details of the reference trace, such as whether or not a pair of pages map to physical addresses that conflict in the simulated cache, which could easily change when the same application is run again with the same cache organization.

Finally, the extremely large memory reference traces required by cache simulations make it expensive and difficult to store and communicate memory reference information, other than the miss rates for the specific cache organizations, that have been simulated.

Analytical cache models use parameters to characterize a memory reference trace and then apply mathematical operations to those parameters in order to predict cache miss rates. Because the parameters are typically far smaller than the reference trace itself, analytical models can greatly reduce the time required to calculate the miss rate for a given cache organization. In addition, the parameters that characterize the reference trace may give insight into the inherent properties of the trace.

SUMMARY

Various embodiments of a mechanism and method for determining a stack distance histogram (i.e., temporal locality) of running software are disclosed. In one embodiment, a hasher may receive a plurality of memory references each including a corresponding address. The hasher may perform a first hash function and a second hash function on each received address. In addition, a sampler may selectively store an indication representative of each corresponding address in a hash table dependent upon results of the first hash function and the second hash function. The stack distance may be determined based upon contents of the hash table.

In one embodiment, the sampler may sample each of the results of the first hash function to determine whether to store an indication representative of a corresponding address in the hash table. The sampler may store an indication representative of a corresponding address in the hash table for at least a subset of the corresponding addresses. The subset of the corresponding addresses may be randomly determined based on sampling criteria. Furthermore, the sampler may determine a storage location in the hash table for an indication representative of the corresponding address based on the results of the second hash function.

In one embodiment, an analytical cache model, which may be accurate over a wide range of cache sizes, degrees of associativity, and application characteristics, may be used for predicting cache miss rates. As a result, it may be used for making architectural design decisions and predicting the performance of future systems. The model may also be applicable to the most commonly used cache organizations, such as direct-mapped caches and set-associative caches that employ the least-recently used (LRU) replacement policy, for example.

In one implementation, the model may use a stack distance metric to characterize the temporal locality of a memory reference trace. In another implementation, the model may also use two additional metrics, which are referred to as a stack filter fraction and a stack merge fraction, for characterizing the spatial locality of the reference trace. In one embodiment, a performance monitoring mechanism may be implemented within a cache subsystem to estimate the stack distance histogram and the degree of spatial locality in the executing program. Because the stack distance, stack filter fraction, and stack merge fraction metrics capture the temporal and spatial locality of a reference trace, they may provide an intuitive and quantitative understanding of the key characteristics of the reference trace which may be independent of any specific cache organization.

In one embodiment, one method may include quantizing and thereby reducing the size of the full stack distance histogram with relatively little loss in the accuracy of the model's predictions. As a result, these metrics may provide a concise characterization of the reference trace, which can be stored and communicated. For example, if a reference trace with 3 billion memory addresses produces histograms with a total of 3 thousand values, the histograms may represent an approximately million-fold reduction in the data that needs to be stored.

The model may provide an analytical formula for calculating the cache miss rate as a function of the cache size, the cache associativity, the stack distance, stack filter fraction, and stack merge fraction metrics of the reference trace. Accordingly, it may be possible to calculate the cache miss rates for relevant cache sizes and degrees of associativity very quickly. In one implementation, since the model uses the standard cumulative Poisson distribution, it is based on a simple and intuitive probabilistic model for the operation of the cache. Finally, the model may naturally classify each cache miss as being a cold miss, a conflict miss, or a capacity miss.

Figure 1:
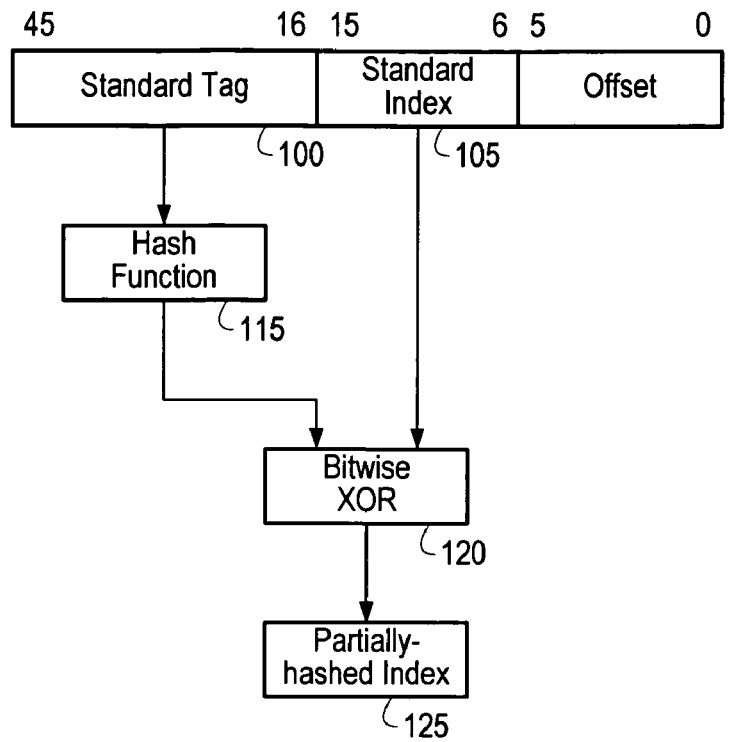
FIG. 1 is a block diagram of one embodiment of a partially hashed index generation mechanism.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Cache Organization

A cache memory includes a number of frames, each of which can hold a single line of data. The frames are partitioned into 's' groups, called sets, each of which can hold 'n' lines. The value n is called the associativity of the cache. If n equals 1, the cache is referred to as direct-mapped, while if both n and s are greater than 1, the cache is referred to as set-associative, and if s equals 1, the cache is referred to as fully-associative. The capacity of the cache, denoted 'c', is the number of frames in the cache. It is noted that all sets may be of equal size, so c=s*n. The line size, denoted 'b', is the number of bytes in each line and the size of the cache is c*b.

An index-generation function 'f' maps from the physical address of a line to the index of one of the sets in the cache. Any given line may only be stored in the set to which its physical address is mapped by 'f'. When a cache is accessed, the index-generation function 'f' may be applied to the physical address of the desired line to select a single set and all of the frames in that set may be checked to see if one of them holds the desired line. If the desired line is not found, one of the lines within the set may be replaced by the desired line (which is fetched from a higher level cache or from memory). In a cache that employs the LRU (least-recently used) replacement policy, the cache line within the selected set which has not been accessed for the longest time is replaced by the desired line. An access which does not find the desired line in the cache is a "miss" and the fraction of accesses that are misses is referred to as the miss rate. One of the most common index-generation functions 'f', commonly referred to as the standard mapping function, includes selecting the appropriate $\log_2$ s bits from the physical address. A cache that uses the standard mapping function is typically referred to as a standard cache. It is noted, however, that the cache miss rate may be estimated using the techniques described below for other types of caches, e.g., subblocked caches.

Some caches employ subblocking to reduce the amount of storage required for the cache tags that specify the physical addresses of the lines stored in the cache. In a subblocked cache, each frame is divided into 'k' equal-sized subblocks, each of which can store a line. All subblocks within a frame share a single tag. The value 'k' is called the degree of subblocking and an aligned set of 'k' contiguous lines is called a block. In a subblocked cache, the unit of allocation is still the frame, so when an access is made to a line which is not present in the cache, an entire frame may be allocated for the line and the previous contents of the frame may be replaced. However, only the desired line may be brought into the cache; the other lines within the same block may not be placed in the cache until they are accessed.

Temporal and Spatial Locality

Given any real number 'r', let floor(r) denote the largest integer less than or equal to 'r' and let round(r) denote floor(r+0.5). Given any positive real number 'r', let ilog(r)= floor ($\log_2$ r). The description that follows may be used to analyze cache miss rates for various memory reference traces, where a reference trace T=$t_0, t_1, \ldots, t_r$ is the sequence of lines accessed by an execution.

Temporal Locality

In one embodiment, the stack distance metric may be used to characterize the temporal locality of a reference trace. If $t_i$ is an access in a reference trace, $t_i$ is warm if there exists an earlier access $t_j$ such that $t_j=t_i$, and $t_i$ is cold otherwise. Given a reference trace 'T', let cold(T) denote the probability that a randomly selected access in 'T' will be cold. For any warm memory access $t_i$, the gap of $t_i$, denoted gap($t_i$), is the sequence of accesses between the last earlier access $t_j$ such that $t_j=t_i$ and $t_i$ itself. The stack distance of $t_i$, denoted dist($t_i$), is the number of distinct lines in gap($t_i$). Given a reference trace 'T' and a non-negative integer 'v', let tem- $poral_v(T)$ denote the probability that a randomly selected access in 'T' will have stack distance exactly equal to 'v'.

Spatial Locality

In one embodiment, two metrics may be used to characterize the spatial locality of a reference trace: the stack filter fraction and the stack merge fraction. The stack filter fraction and the stack merge fraction may also be referred to as the filter function and the merge function. Both of these metrics make use of the concept of a window of lines. Given any non-negative integer 'w', we partition the physical address space into aligned sets, each of which includes $2^w$ contiguous lines and is called a window of size $2^w$.

Given any non-negative integer 'w' and any access $t_i$, let $match_w(t_i)$ denote the number of accesses in $gap(t_i)$ that are in the window of size $2^w$ that contains $t_i$. Given any non-negative integer 'w' and any access $t_i$, let $filter_w(t_i)$ equal $1-(match_w(t_i)/dist(t_i))$. Given a reference trace 'T' and non-negative integers 'v' and 'w', let $filter_{v,w}(T)$ equal the expected value of $filter_w(t_i)$ for a randomly selected access $t_i$ such that $ilog(dist(t_i))=v$. The values $filter_{v,w}(T)$ may be referred to as the filter fractions for 'T'. These will be used to produce miss rate estimates for both subblocked and non-subblocked caches.

Given any non-negative integer 'w' and any access $t_i$, let $unique_w(t_i)$ denote the number of unique windows of size $2^w$ that contain accesses in $gap(t_i)$. Given any non-negative integer 'w' and any access $t_i$, let $merge_w(t_i)$ equal $unique_w(t_i)/dist(t_i)$. Given a reference trace 'T' and non-negative integers 'v' and 'w', let $unique_{v,w}(T)$ equal the expected value of $unique_w(t_i)$ for a randomly selected access $t_i$ such that $ilog(dist(t_i))=v$. The values $merge_{v,w}(T)$ will be called the merge fractions for 'T'. They will be used to produce miss rate estimates for subblocked caches.

Analytical Cache Model

In one embodiment, the analytical cache model used to predict cache miss rates is based on the Poisson distribution $$p(k, \lambda) = e^{-\lambda}\left(\frac{\lambda^k}{k!}\right)$$

and the cumulative Poisson distribution $$p(k, \lambda) = \sum_{i=0}^{k} e^{-\lambda}\left(\frac{\lambda^i}{i!}\right)$$

The Poisson distribution $p(k,\lambda)$ represents the probability of finding exactly 'k' marked points in a randomly selected unit interval of a line which has on average '$\lambda$' marked points per unit interval, assuming the marked points are distributed randomly and independently along the line.

Ideally, an analytical cache model may provide:
accurate miss rate predictions,
the ability to model commonly-used cache organizations,
fast generation of parameters from the memory reference trace,
insight into the inherent properties of the execution,
small data storage requirements,
fast generation of miss rate predictions from the parameters,
insight into how the properties of the execution affect the miss rates, and
an intuitive characterization of the causes of cache misses.

Model Using Temporal Locality

In one embodiment, a form of the model may be used that incorporates only the temporal locality of the reference trace. Given a reference trace 'T' and the probabilities $temporal_v(T)$, the temporal locality model's estimated miss rate for an n-way set-associative non-subblocked cache with 's' sets and LRU replacement is $$TModel(T, s, n) = 1 - \sum_{v=0}^{\infty} temporal_v(T) P\left(n-1, \frac{v}{s}\right)$$

The above formula follows directly from a very straightforward, intuitive model of a cache. Consider an arbitrary memory reference $t_i$ in T. In order for $t_i$ to hit in the cache, there should be an earlier access to the same line. Let $t_j$ be the last access earlier than $t_i$ such that $t_j=t_i$ and let $s_i$ denote the set in the cache to which $t_i$ maps. First, note that whether or not $t_i$ will be a hit depends only on the number of distinct lines within $gap(t_i)$ that map to $s_i$, and not the number of times each of those lines is accessed. This is because the first access to any given line within $gap(t_i)$ that maps to $s_i$ will move that line ahead of $t_i$ in the LRU stack of lines stored in set $s_i$, but successive accesses to that line will only rearrange the order of the lines ahead of $t_i$, not increase the number of lines ahead of $t_i$. This is the reason that the stack distance is defined in terms of the number of distinct lines in $gap(t_i)$ rather than the total number of accesses in $gap(t_i)$.

Next, notice that $t_i$ will be a hit if and only if there are fewer than 'n' distinct lines within $gap(t_i)$ which map to set $s_i$. If we assume that the distinct lines within $gap(t_i)$ map to the 's' sets in the cache uniformly and independently, we can use the Poisson distribution $p(k, dist(t_i)/s)$ to estimate the probability that exactly 'k' lines within $gap(t_i)$ map to $s_i$. As a result, we can use the Cumulative Poisson distribution $P(n-1, dist(t_i)/s)$ to estimate the probability that n−1 or fewer distinct lines within $gap(t_i)$ map to $s_i$, which is exactly the probability that $t_i$ is a hit. Creating a weighted sum of these hit probabilities, with the weights based on the probability of each value of $dist(t_i)$, gives the overall probability of a hit, and subtracting this probability from 1 completes the formula for the probability of a miss.

Finally, notice that for any reference trace 'T', $$cold\ (T) + \sum_{v=0}^{\infty} temporal_v(T) = 1$$

Therefore, although the cold miss rate cold(T) is not directly included in the formula for TModel(T,s,n), the effect of cold misses is included by the fact that the sum of the temporal locality probabilities $temporal_v(T)$ does not sum to 1. As a result, techniques that calculate the temporal locality probabilities $temporal_v(T)$ will implicitly provide the cold miss rate. Furthermore, note that the miss rate for a fully-associative cache is $$\sum_{v=n}^{\infty} temporal_v(T)$$

Thus, techniques that calculate the temporal locality probabilities $temporal_v(T)$ may also implicitly provide the capacity miss rate (which is typically defined to be the miss rate for a fully-associative cache of the same size).

Model Using Temporal and Spatial Locality

In some cases, the above model may have an inherent tendency to overestimate the cache miss rate. To see this, consider once again an arbitrary memory reference $t_i$ in 'T' which maps to set $s_i$. Note that the s−1 lines immediately preceding 't' in the physical address space and the s−1 lines immediately following t in the physical address space necessarily map to sets other than $s_i$. Furthermore, due to spatial locality in the reference trace 'T', it is possible that a significant number of the lines accessed within $gap(t_i)$ are within s−1 or fewer lines from $t_i$ in the physical address space and therefore have no chance of mapping to $s_i$. The extent to which such spatially local lines contribute to the number of unique lines within $gap(t_i)$ is a function of both the length of $gap(t_i)$ and the number of sets in the cache, 's'. The following cache model incorporates this effect of spatial locality by using the filter fractions for 'T' to reduce the effective size of $gap(t_i)$. Accordingly, given a reference trace 'T' and the probabilities $temporal_v(T)$ and $filter_{v,s}(T)$, the temporal and spatial locality model's estimated miss rate for an n-way set-associative non-subblocked cache with 's' sets and LRU replacement is $$TSModel(T, s, n) = 1 - temporal_0(T) - \sum_{v=1}^{\infty} temporal_v(T) P\left(n - 1, (filter_{ilog(v),ilog(s)}(T))\left(\frac{v}{s}\right)\right)$$

Note that the summation starts at 1, rather than 0, in order to avoid passing the value 0 to ilog(v). As a result, $temporal_0(T)$ is listed separately from the summation.

Methodology

It may be shown, through simulation of the execution of various applications and obtaining a trace of the memory references from each application, that both the temporal model (TModel) and the temporal and spatial model (TSModel) have some predictive power. The temporal and spatial locality metrics may be calculated from the traces using the performance monitoring mechanism and the algorithms described below. The temporal and spatial locality metrics may then be given as inputs to the analytical cache models and the results of the models' predictions may be compared with the simulated results.

The average and maximum percentage relative error for both analytical models for each application and cache type, over the range of simulated cache sizes and associativities, may be gathered. In addition, the percentage relative bias, which is the average of the signed relative errors (and thus a negative bias indicates that the model tended to predict too low a miss rate) may be calculated. Although the models offer some predictive power for cache miss rates, some of the errors typically associated with the model for a standard cache may be reduced by using a partially-hashed cache.

Caches with Partially-Hashed Indices

Most of the above-referenced errors may be caused by a consistent tendency for the model to underestimate the true cache miss rate for a standard cache. However, the model is simply assuming that the cachelines map to sets randomly, so the fact that the standard cache has a higher miss rate indicates that it has a tendency to map cachelines to sets in an uneven manner, with some sets being mapped to an excessive number of cachelines. As a result, the miss rate may be improved by designing a cache which randomizes the mapping of cachelines to sets. Caches which use a random index-generating function have been studied; however, a random mapping may destroy the spatial locality of a standard cache.

Instead, a partially-hashed index-generating function may be used which obtains a significant amount of randomization while maintaining good spatial locality. FIG. 1 illustrated one embodiment of a partially-hashed cache with 1024 sets using 64B cachelines. Specifically, in a partially-hashed cache, the generating function used for generating the partially-hashed index 125 includes calculating a hash function 115 of the upper bits of the physical address (which may be used as the tag 100 in a standard cache), and using the bitwise Exclusive-OR 120 of the hashed value and the remaining bits of the cacheline address (which may be used as the index 105 in a standard cache). In various embodiments, it may be possible to reduce the above-referenced errors associated with using the model with a standard cache and decrease the average miss rate by using a partially-hashed cache with the model. It is noted, however, that in other embodiments the partially-hashed cache may include any number of sets with cachelines of different sizes.

Subblocked Caches

To this point, the analytical cache model described above has applied only to non-subblocked caches. In this section, the model is extended to apply to subblocked caches.

To model subblocked caches, for any given access $t_i$, it may be necessary to determine the expected number of unique blocks in $gap(t_i)$. The subblocked cache model uses the merge fractions to provide the expected number of unique blocks per gap. Given a reference trace 'T' and the probabilities $temporal_v(T)$, $filter_{v,s}(T)$, and $merge_{v,w}(T)$, the temporal and spatial locality model's estimated miss rate for an n-way set-associative, k-way, sub-blocked cache with s sets and LRU replacement is $$TSSubModel(T, s, n, k) = 1 - temporal_0(T) - \sum_{v=1}^{\infty} temporal_v(T) P\left(n - 1, (filter_{ilog(v),ilog(s)}(T))(merge_{ilog(v),ilog(k)}(T))\left(\frac{v}{s}\right)\right)$$

Performance Monitors for Locality Metrics

In various embodiments, hardware mechanisms may be used to accurately estimate the temporal and spatial locality of an executing program. The hardware mechanisms may utilize a framework in which:

1. a memory reference 'R' is selected randomly,
2. successive memory references are passed to performance monitoring hardware that determines the relevant metrics, until
3. the next memory reference to the same cacheline (or appropriate unit of spatial locality) is encountered, and
4. a trap is taken so that the results of the performance monitoring hardware can be inspected and processed by software.

The above process may be repeated until a statistically valid sample of random memory references has been obtained. Note that a timeout may be added to step 3 in order to make progress when the cacheline referenced by 'R' is not accessed again for an excessively long period (in which case the stack distance is viewed as being infinite).

Determination of Stack Distance

Figure 2:
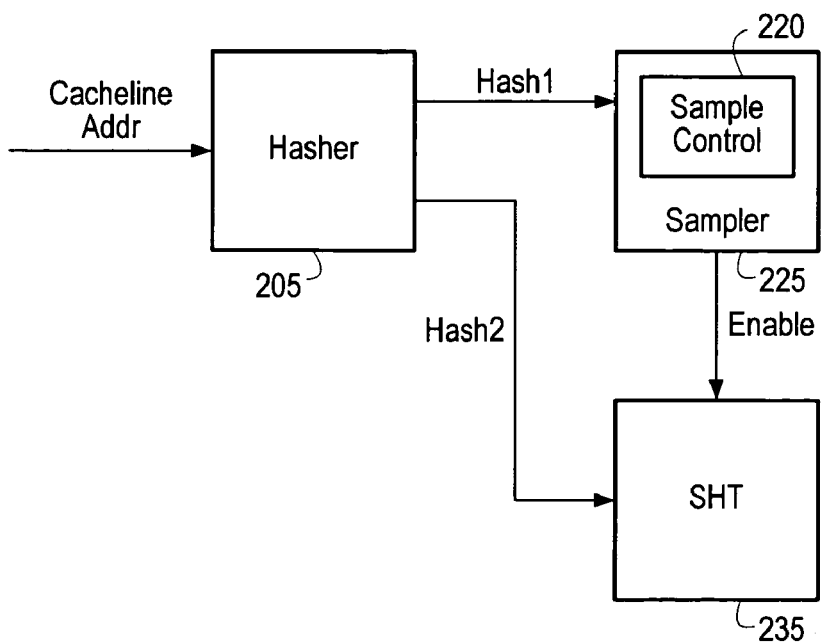
FIG. 2 is a block diagram of one embodiment of a stack distance performance monitoring mechanism.

FIG. 2 is a block diagram of one embodiment of a performance monitoring mechanism. As illustrated in the embodiment of FIG. 2, the performance monitoring mechanism may include three units: a hasher 205, a sampler 225, and a saturating hash table (SHT) 235. The performance monitoring mechanism is used to determine a stack distance histogram for running software. A stack distance may be defined as the number of distinct cachelines that were accessed between steps 1 and 3 above. The stack distance histogram may be used in the above referenced model to estimate cache miss rates. It is noted, however, that the stack distance metrics derived via the performance monitoring mechanism may be used in other analytical cache models to estimate cache miss rates.

Figure 3:
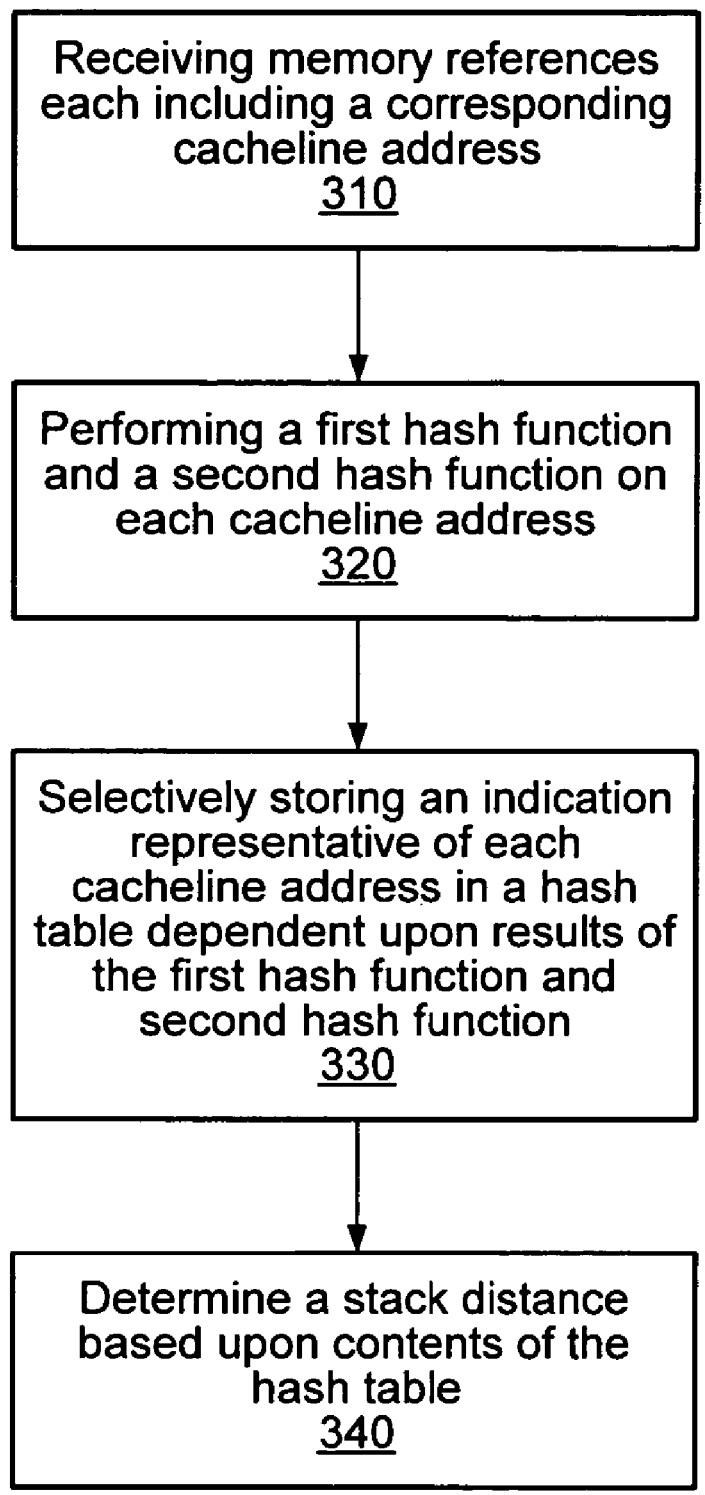
FIG. 3 is a flow diagram illustrating a method for determining a stack distance for running software.

FIG. 3 is a flow diagram illustrating a method for determining a stack distance for running software. It should be noted that in various embodiments, some of the steps shown may be performed concurrently, in a different order than shown, or omitted. Additional steps may also be performed as desired.

Referring collectively to FIG. 2 and FIG. 3, after a memory reference is randomly selected to determine a stack distance, the performance monitor receives subsequent memory references, each including a corresponding cacheline address, as indicated in block 310. Each received cacheline address is passed to the hasher, which generates two deterministic hash function outputs (hash1 and hash2) based on the address, as indicated in block 320. The first hash function output (hash1) is provided to sampler 225 and the second hash function output (hash2) is provided to SHT 235.

As indicated in block 330, in one embodiment, sampler 225 selectively stores an indication representative of each cacheline address corresponding to each received memory reference in SHT 235 dependent upon results of the first hash function and the second hash function. In one implementation, SHT 235 may be an array of 'z' bits (tablesize), all of which may be set to either binary 0 or 1, and all of which are initialized to binary 0. For example, the performance monitoring mechanism may include a 64-bit or a 32-bit SHT 325. In this implementation, sampler 225 may selectively set a corresponding bit in SHT 235 to binary 1 depending upon the results of hash1 and hash2. It is noted, however, that in other embodiments an indication representative of each address corresponding to each memory reference may be stored by other mechanisms.

Sampler 225 may include a programmable sample control register 220 that determines the probability that a random value of hash1 will result in asserting the enable signal to SHT 235. In other words, sampler 225 may sample the results of hash1 corresponding to each of the received memory references to determine when to assert the enable signal, which sets a corresponding bit in SHT 235 to binary 1. For example, the sampling factor of sample control 220 may dictate that one out of every hundred values of hash1 asserts the enable signal. In this way, a random sample of the received memory references may be allowed to update SHT 235. In one embodiment, sample control 220 may sample the received memory references by specifying the required number of trailing 0s in hash1 in order for the enable signal to be asserted. It is noted, however, that in other embodiments sampler 225 may implement different sampling criteria. It is further noted that in various embodiments the sampling factor may varied, e.g., the sampling factor may be programmable. The sampling factor may also be set to 1, which results in the enable signal being asserted for every received memory reference.

In one embodiment, the output of the second hash function (hash2) may be used as an index to SHT 235 to determine which bit to set. If the enable signal is asserted for a given cacheline, the bit at location hash2 in SHT 235 is set to 1. If the enable signal is not asserted, SHT 235 is not updated and the corresponding bit maintains its value. It is noted that in the implementation described above, when a memory reference is selected randomly to determine a stack distance, all the bits of SHT 235 are initially set to binary 0. It is noted, however, that in other embodiments the bits of SHT 235 may be managed by other methods, e.g., all the bits of SHT 235 may be originally set to binary 1, and if the enable signal is asserted the corresponding bit may be subsequently set to binary 0.

The above-described process may be performed for every subsequent memory reference received at the performance monitoring mechanism until the randomly selected memory reference is again detected. In other words, this process may be performed for every subsequent cacheline access until the randomly selected cacheline is accessed again. When an address is detected that matches the address corresponding to the randomly selected memory reference, updates to SHT 235 are stopped. A processing unit, e.g., software being executed by microprocessor 775 of FIG. 7, may then read the number of bits set in SHT 325 and may determine a stack distance based on the contents of SHT 325, as indicated in block 340.

During operation, because hash1 and hash2 are deterministic, multiple accesses to the same cacheline may map to the same storage location in SHT 235 and only a single bit may be set for all of the accesses to that particular cacheline. In addition, distinct cachelines may map to the same storage location in SHT 235. In one implementation, hash1 makes the probability that any two distinct cachelines will map to the same storage location in SHT 235 equal to 1/z (i.e., 1/tablesize). Since stack distance is defined as the number of distinct cachelines that were accessed, in some embodiments, mathematical operations may be performed on the detected number of bits set in SHT 325 to accurately determine the stack distance, as will be described further below. The mathematical operations may account for the fact that distinct cachelines may map to the same storage location in SHT 235 and may also account for the specific sampling factor (or other sampling criteria) that is implemented by sampler 225.

In one embodiment, when sampler 225 is programmed such that every cacheline access causes the enable signal to SHT 235 to be asserted, the following mathematical operations may be performed to determine a stack distance for a running software program. Let 'd' denote the number of unique cachelines accessed in step 2 (that is, the stack distance) and let 'x' denote the number of bits set in SHT 235. The processing unit may calculate an unbiased estimate for 'd' given 'x' (an estimator est(x) is unbiased if and only if, for every value of 'd', the expected value of est(x)=d). It can be seen that there is a unique unbiased estimator for 'd' and that it should satisfy the equations est(0)=0 (because if d=0, x should equal 0) and for all x>0, $$est(d) = \frac{\left(d - \sum_{x=0}^{d-1}(prob(d,x)est(x))\right)}{prob(d,d)}$$

where prob(d,x) denotes the probability of having exactly 'x' bits set in SHT 235 for the given value of 'd'. Therefore, the values of est(x) may be calculated iteratively once the values of prob(d,x) are known. The values of prob(d,x) may themselves be calculated iteratively given the equations prob(0, 0)=1, prob(1,1)=1, and for all d>1, $$prob(d, x) = \left(\frac{x}{tablesize}\right)prob(d-1, x) + \left(1 - \frac{x-1}{tablesize}\right)prob(d-1, x-1)$$

The values of est(x) may be good estimates for 'd' when 'x' is neither too small (e.g. <tablesize/4) nor too large (e.g. >tablesize/2), which is one reason why sampler 225 may be used. The processing unit (e.g., software being executed by microprocessor 775) may set the sample control parameter of sampler 225 to cycle through a range of different values on successive passes through steps 1 through 4 above. If x>tablesize/2, in one embodiment, the result may be recorded as being an excessively large stack distance for the given value of sample control and no attempt may be made to estimate the stack distance for this sample. On the other hand, if x<=tablesize/2, est(x) may be calculated as defined above and then multiplied by the sampling factor in order to estimate 'd'. In this way, the specific sampling factor (or other sampling criteria) that is implemented by sampler 225 and the fact that distinct cachelines may map to the same storage location in SHT 235 may be accounted for to determine the stack distance.

Furthermore, the processing unit may maintain a separate histogram of 'x' values obtained for each value of sample control. It then may use each histogram to obtain an estimate for the frequency of each value of 'd'. Specifically, for a given value of sample control, each value of 'x' corresponds to a unique estimate of 'd' as defined above, so each value of 'x' can be viewed as defining a bucket including all of the values of 'd' (viewed as a real number) for which 'd' is closer to est(x) than to est(y) for all 'y' not equal to 'x'. The frequency of obtaining each value of x may then be divided by the size of the bucket defined by 'x' in order to create an estimate for the probability density function for 'd' (viewed as a real number). Finally, the probability density functions created by the different values of sample control may be combined into a single probability density function, where the probability density estimated for each value of 'd' is given by the estimate from the value of sample control that has the largest sample size while still providing an estimate for the given value of 'd' (e.g., x<=tablesize/2). It is noted, however, that in other embodiments other mathematical operations or variations thereof may be performed on the detected number of bits set in SHT 235 to determine the stack distance.

In some embodiments, hasher 205 of the performance monitoring mechanism may generate only one hash function output for each address corresponding to each received memory reference. In this embodiment, sampler 225 may be bypassed, the enable line may be permanently asserted, or sampler 225 may not be included in the performance monitoring mechanism. In this case, an indication representative of each of the memory reference addresses may be stored in SHT 235 dependent upon results of the hash function. For example, the hash function output may determine which storage location in SHT 235 to set to binary 1. Then, as described above, the stack distance may be determined based on the contents of SHT 235.

Determination of Spatial Locality

Figure 4:
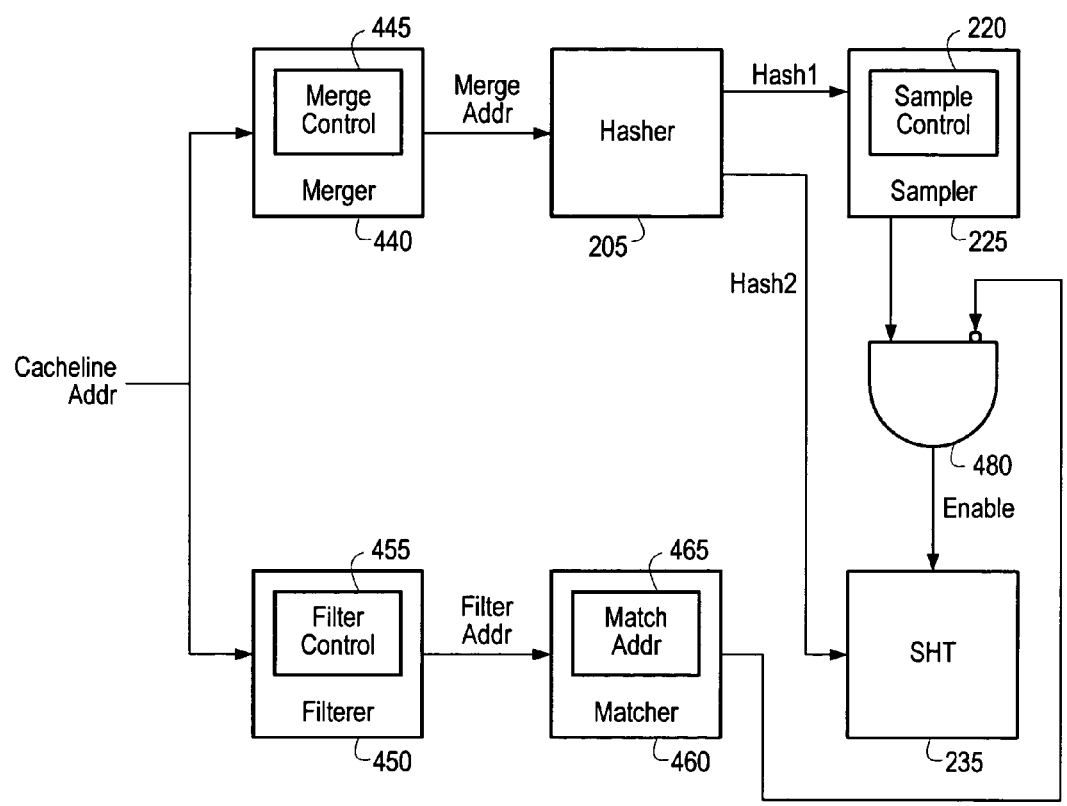
FIG. 4 is a block diagram of one embodiment of a temporal and spatial locality performance monitoring mechanism.

FIG. 4 illustrates a block diagram of one embodiment of a performance monitoring mechanism that calculates the stack distance histogram, modified by filter and merge functions to consider special locality. Components that correspond to those shown in the embodiment of FIG. 3 are numbered identically for simplicity and clarity. Spatial locality is typically defined qualitatively as being the tendency of successive accesses to access nearby regions of the physical address space. The modified stack distance histogram may be used in the above referenced model to estimate cache miss rates. By determining spatial locality via the filter and merge functions, more accurate cache miss rates may be estimated. Note that spatial locality is defined in terms of accesses that are nearby in time; therefore, spatial locality metrics rely upon some characteristics of temporal locality. It is noted that in other embodiments the temporal and spatial locality derived via the performance monitoring mechanism may be used in other analytical cache models to estimate cache miss rates.

In one specific implementation, the performance monitoring mechanism is formed as illustrated in the embodiment of FIG. 4. In this embodiment, the performance monitoring mechanism includes a merger 440, a hasher 205, a sampler 225, AND gate 480, filterer 450, matcher 460, and saturating hash table (SHT) 235. In some embodiments, the performance monitoring mechanism may include all the components shown in FIG. 4 except for filterer 450 and matcher 460. In other embodiments, the performance monitoring mechanism may include all the components shown in FIG. 4 except for merger 440.

Figure 5:
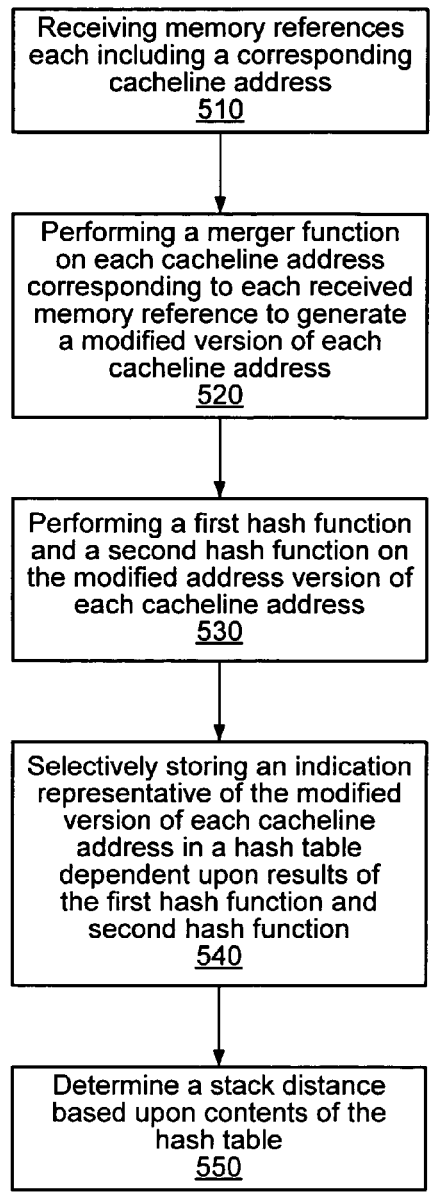
FIG. 5 is a flow diagram illustrating a method for determining a stack distance modified by the merge function for running software.

FIG. 5 is a flow diagram illustrating a method for determining a stack distance modified by the merge function for running software. It should be noted that in various embodiments, some of the steps shown may be performed concurrently, in a different order than shown, or omitted. Additional steps may also be performed as desired.

Referring collectively to FIG. 4 and FIG. 5, after a memory reference is randomly selected to determine a stack distance, the performance monitor receives subsequent memory references, each including a corresponding cacheline address, as indicated in block 510. In block 520, each received cacheline address is passed to merger 440 which performs a merge function on each cacheline address corresponding to each received memory reference to generate a modified version of each address (merge addr) corresponding to each received memory reference. Each received cacheline address may also be passed to filterer 450, as will be described further below with reference to FIG. 6.

In one embodiment, merger 440 may set a programmable number of lowest address bits to binary zero to generate a modified version of each cacheline address corresponding to each received memory reference. The number of address bits set to binary zero may be controlled by merge control unit 445 of merger 440. In one embodiment, by setting the lowest 'k' address bits to binary zero, all accesses within the same address window of size $2^k$ will hash to the same storage location in SHT 235, thus capturing the merge fraction effect of using a $2^k$-way subblocked cache. In other words, this has the effect of quantifying the spatial locality of the running software as it would affect a $2^k$-way subblocked cache. The modified version of each cacheline address is then provided to hasher 205.

As indicated in block 530, hasher 205 performs a first hash function (hash1) and a second hash function (hash2) on the modified version of each cacheline address corresponding to each received memory reference. The first hash function output (hash1) is provided to sampler 225 and the second hash function output (hash2) is provided to SHT 235.

Sampler 225 selectively stores an indication representative of the modified version of each cacheline address in a hash table dependent upon results of the first hash function and the second hash function, as indicated in block 540. In one implementation, SHT 235 may be an array of 'z' bits (tablesize), all of which may be set to either binary 0 or 1, and all of which are initialized to binary 0. For example, the performance monitoring mechanism may include a 64-bit or a 32-bit SHT 325. In this implementation, sampler 225 may selectively set a corresponding bit in SHT 235 to binary 1 depending upon the results of hash1 and hash2. It is noted, however, that in other embodiments an indication representative of the modified version of each address corresponding to each memory reference may be stored by other mechanisms Sampler 225 may include a programmable sample control register 220 that determines the probability that a random value of hash1 will result in asserting the enable signal to SHT 235. In other words, sampler 225 may sample the results of hash1 corresponding to the modified version of each cacheline address to determine when to assert the enable signal, which sets a corresponding bit in SHT 235 to binary 1. For example, the sampling factor of sample control 220 may dictate that one out of every hundred values of hash1 asserts the enable signal. In this way, a random sample of the received memory references may be allowed to update SHT 235. In one embodiment, sample control 220 may sample the modified version of each cacheline address corresponding to each received memory reference by specifying the required number of trailing 0s in hash1 in order for the enable signal to be asserted. It is noted, however, that in other embodiments sampler 225 may implement different sampling criteria. It is further noted that in various embodiments the sampling factor may varied, e.g., the sampling factor may be programmable. The sampling factor may also be set to 1, which results in the enable signal being asserted for every received memory reference. In embodiments where the performance monitoring mechanism implements both the merge function and the filter function, the results of the filter function also dictate whether the SHT 235 is updated, as will be further described below.

In one embodiment, the output of the second hash function (hash2) may be used as an index to SHT 235 to determine which bit to set. If the enable signal is asserted for a given cacheline, the bit at location hash2 in SHT 235 is set to 1. If the enable signal is not asserted, SHT 235 is not updated and the corresponding bit maintains its value. It is noted that in the implementation described above, when a memory reference is selected randomly to determine a stack distance, all the bits of SHT 235 are set to binary 0. It is noted, however, that in other embodiments the bits of SHT 235 may be managed by other methods, e.g., all the bits of SHT 235 may be originally set to binary 1, and if the enable signal is asserted the corresponding bit may be subsequently set to binary 0

The above-described process may be performed for every subsequent memory reference received at the performance monitoring mechanism until the randomly selected memory reference is again detected. In other words, this process may be performed for every subsequent cacheline access until the randomly selected cacheline is accessed again. When an address is detected that matches the address corresponding to the randomly selected memory reference, updates to SHT 235 are stopped. A processing unit, e.g., software being executed by microprocessor 775 of FIG. 7, may then read the number of bits set in SHT 325 and may determine a stack distance based on the contents of SHT 325, as indicated in block 550. By implementing the merge function, the stack distance, and therefore cache miss rates, for subblocked caches may be determined. The stack distance of the running software may be calculated similarly as described above with reference to FIGS. 2 and 3, with the exception that the modified version of each cacheline address corresponding to each received memory reference is used. It is noted, however, that in other embodiments other mathematical operations or variations thereof may be performed on the detected number of bits set in SHT 235 to determine the stack distance.

Figure 6:
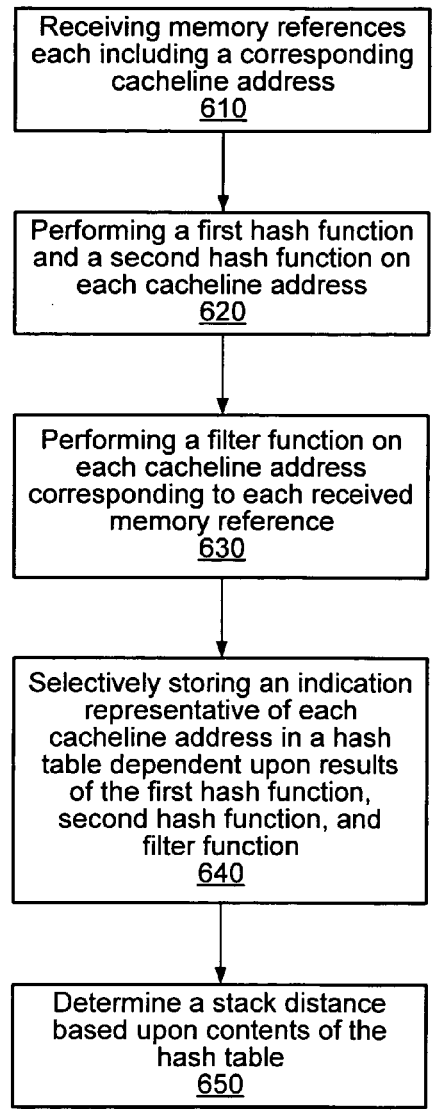
FIG. 6 is a flow diagram illustrating a method for determining stack distance modified by the filter function for running software.

FIG. 6 is a flow diagram illustrating a method for determining a stack distance modified by the filter function for running software. It should be noted that in various embodiments, some of the steps shown may be performed concurrently, in a different order than shown, or omitted. Additional steps may also be performed as desired.

Referring collectively to FIG. 4 and FIG. 6, a first memory reference including a first cacheline address is randomly selected to determine a stack distance of a running software program. A modified version of the first address may be generated by setting the w less significant bits of the first address to binary zero, and the result may be stored in match address unit 465 of matcher 460. The performance monitoring mechanism receives subsequent memory references, each including a corresponding cacheline address, as indicated in block 610. In block 620, each received cacheline address is passed to the hasher, which generates two deterministic hash function outputs (hash1 and hash2) based on the address. The first hash function output (hash1) is provided to sampler 225 and the second hash function output (hash2) is provided to SHT 235.

Each of the received cacheline addresses is also provided to filterer 450. Filterer 450 performs a filter function on each address corresponding to each received memory reference, as indicated in block 630. Filterer 450 and matcher 460 are used to filter out accesses that are within the same address window of size $2^w$ as the first address corresponding to the first memory reference, thus capturing the filter function effect of using a cache (e.g., standard indexing or partially-hashed indexing cache) with $2^w$ sets. Specifically, filter control unit 455 of filterer 450 and matcher 460 may first be programmed with the value of 'w'. Then, a modified version of each address (filter addr) corresponding to each received memory reference may be generated by setting the w less significant bits of each corresponding address to binary zero. It is noted that in some embodiments the value of 'w' may programmable to set the desired address window of size $2^w$.

The modified version of each address (filter addr) may be provided to matcher 460. Matcher 460 may compare the modified version of each address corresponding to each received memory reference to the modified version of the first address stored in match address unit 465. In some embodiments, the result of the comparison may depend on the result of the sampling operation performed by sampler 225. Sampler 225 may process the output of the first hash function (hash1) similarly as described above with reference FIGS. 2-5. Specifically, as indicated in block 640, sampler 225 (including AND gate 480) selectively stores an indication representative of each corresponding address in SHT 235 dependent upon results of the first hash function, the second hash function, and the filter function. In various embodiments, the results of the sampling operation and the results of the filtering operating may be provided to a logic gate, e.g., AND gate 480, to determine whether to assert the enable signal and update SHT 235.

In one embodiment, as illustrated in the embodiment of FIG. 4, if the sampling operating determines that an indication representative of a corresponding address should be stored in SHT 235 and if a modified version of the corresponding address does not match the modified version of the first address, the enable signal is asserted and therefore an indication representative of the corresponding address is stored in SHT 235. As described previously, the results of the second hash function (hash2) may be used as an index for SHT 235 to determine which storage location to set. If the modified version of a corresponding address matches the modified version of the first address, the enable signal is not asserted and so SHT 235 is not updated. Similarly, if the sampling operation determines that an indication representative of a corresponding address should not be stored in the hash table, the enable signal is not asserted and therefore SHT 235 is not updated.

Figure 7:
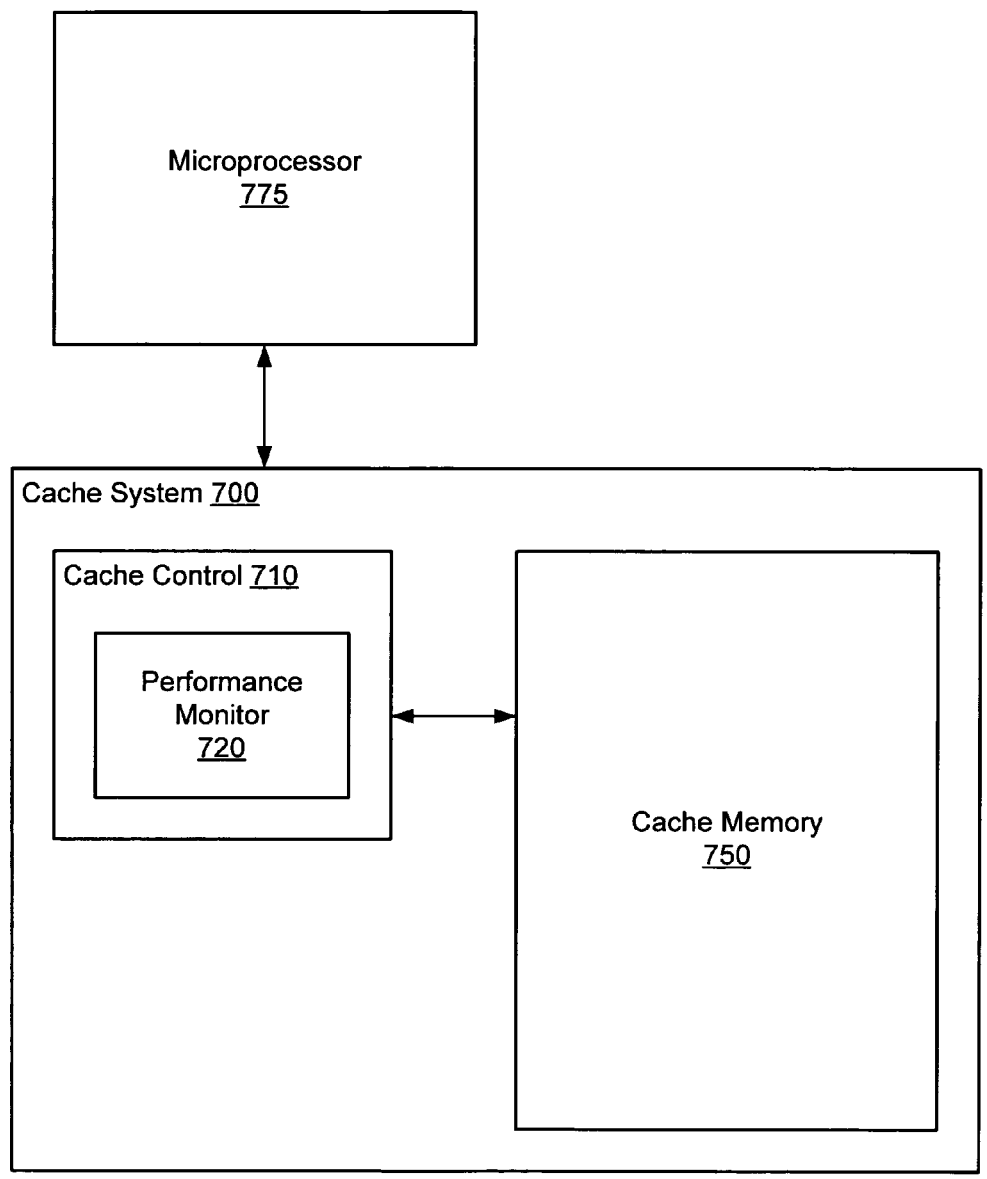
FIG. 7 is a block diagram of one embodiment of a cache system.

A processing unit, e.g., software being executed by microprocessor 775 of FIG. 7, may then read the number of bits set in SHT 235 and may determine a stack distance based on the contents of SHT 235, as indicated in block 650. The processing unit may determine the stack distance of the running software similarly as described above with reference to FIGS. 2 and 3, with the exception that if a merge function is implemented the modified version of each cacheline address corresponding to each received memory reference is used. Specifically, in one embodiment, the stack distance estimate derived from SHT 235 may be processed using the TModel to yield cache miss rate estimates similar to those produced by the TSModel (if no merge function was used), or the TSSubModel (if a merge function was used). It is noted, however, that in other embodiments other mathematical operations or variations thereof may be performed on the detected number of bits set in SHT 235 to determine the stack distance.

As described above, in various embodiments, to calculate the stack distance of running software, the performance monitoring mechanism may either implement the merge function, the filter function, or both the merge function and the filter function, in addition to the hashing and sampling operations. These spatial locality metrics may help to derive more accurate cache miss rates.

In some embodiments where both the merge function and the filter function are implemented, the processing unit may set the merge control 445 and filter control 455 fields to the desired values. Then, sampler 225 may perform a series of samples as described above to determine an estimate for the resulting stack distance probability density function. This may then be used with an analytical cache model (e.g., the TModel described above) to produce an estimate for the cache miss rate of caches with a given amount of subblocking and number of sets.

It is noted that in other embodiments, hasher 205 of the performance monitoring mechanism may generate only one hash function output (hash1) for each address corresponding to each received memory reference, and the performance monitoring mechanism may not perform a sampling operation, e.g., may not include sampler 225. In these embodiments, if only a merge function is implemented, merger 440 may generate a modified version of each address corresponding to each received memory reference, and an indication representative of the modified version of each corresponding address may be stored in SHT 235 dependent upon results of the hash function (hash1). If only a filter function is implemented, an indication representative of each corresponding address may be stored in SHT 235 dependent upon results of the hash function (hash1) and the filter function. If both a merge function and a filter function are implemented, an indication representative of the modified version of each corresponding address may be stored in SHT 235 dependent upon results of the hash function (hash1) and the filter function. Then, as described above, the stack distance may be determined based on the contents of SHT 235.

Cache System

Referring to FIG. 7, a block diagram of one embodiment of a computer system is shown. Computer system includes a microprocessor 775 coupled to cache system 700. Cache system 700 includes a cache control 710 coupled to a cache memory 750. Cache control 710 includes a performance monitor 720. In various embodiments, performance monitor 720 may include the performance monitoring mechanisms and algorithms described above in conjunction with the descriptions of FIG. 1 through FIG. 6. For example, in various embodiments, performance monitor 720 may be configured to perform the functions and algorithms associated with determining spatial and temporal localities of running software. In addition, performance monitor 720 may be configured to perform functions associated with determining a stack distance histogram (with or without spatial locality metrics) that may be used in determining the performance of cache system 700. It is noted in other embodiments, cache system 700 or portions thereof, may be included within microprocessor 775. It is further noted that in some embodiments cache system 700 may include two or more instances of the performance monitor 720. In addition, it is noted that other computer system components have been omitted for simplicity.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   receiving a plurality of memory references each including a corresponding address;
   performing a first hash function and a second hash function on each address corresponding to each received memory reference;
   selectively storing an indication representative of each corresponding address in a hash table dependent upon results of the first hash function and the second hash function; and
   determining a stack distance based upon contents of the hash table.

2. The method of claim 1, wherein said selectively storing an indication representative of each corresponding address in a hash table includes sampling each of the results of the first hash function to determine whether to store an indication representative of a corresponding address in the hash table.

3. The method of claim 2, wherein said selectively storing an indication representative of each corresponding address in a hash table further includes storing an indication representative of a corresponding address in the hash table for at least a subset of the corresponding addresses, wherein the subset of the corresponding addresses is randomly determined based on sampling criteria.

4. The method of claim 3, wherein said selectively storing an indication representative of each corresponding address in a hash table further includes, in response to the sampling operation determining that an indication representative of a corresponding address is to be stored in the hash table, determining a storage location in the hash table for the indication representative of the corresponding address based on the results of the second hash function.

5. The method of claim 4, wherein the hash table includes a plurality of storage locations, each storage location configured to store an indication representative of a corresponding address.

6. The method of claim 5, wherein said determining a stack distance based upon contents of the hash table includes determining the number of storage locations in the hash table including an indication representative of a corresponding address.

7. The method of claim 6, wherein said determining a stack distance based upon contents of the hash table further includes determining a stack distance 'd' based upon a determined number of storage locations 'x' including an indication representative of a corresponding address in a hash table of size 'tablesize', wherein the stack distance 'd' is determined as follows:

$$est(0) = 0, \text{ and for all } x > 0: est(d) = \frac{\left(d - \sum_{x=0}^{d-1}(prob(d, x)est(x))\right)}{prob(d, d)}$$

where: $prob(0, 0) = 1$, $prob(1, 1) = 1$, and for all $d > 1$: $prob(d, x) =$ $$\left(\frac{x}{tablesize}\right)prob(d-1, x) + \left(1 - \frac{x-1}{tablesize}\right)prob(d-1, x-1)$$

8. The method of claim 7, wherein said determining a stack distance based upon contents of the hash table further includes, if a sampling factor is used to determine the subset of the corresponding addresses, multiplying a determined stack distance 'd' by the sampling factor to determine a stack distance when a particular sampling factor is used.

9. The method of claim 1, further comprising randomly selecting a memory reference to determine the stack distance of the randomly selected memory reference.

10. The method of claim 9, further comprising executing a software program using a processing unit, wherein, during execution of the software program, receiving the plurality of memory references each including a corresponding address to determine a stack distance histogram for the software program.

11. A method comprising:
 receiving a plurality of memory references each including a corresponding address;
 performing a first hash function on each address corresponding to each received memory reference;
 storing an indication representative of each corresponding address in a hash table dependent upon results of the first hash function; and
 determining a stack distance based upon contents of the hash table.

12. A performance monitoring mechanism for a cache system, the performance monitoring mechanism comprising:
 a hashing unit configured to receive a plurality of memory references each including a corresponding address, wherein the hashing unit is further configured to perform a first hash function and a second hash function on each address corresponding to each received memory reference;
 a sample control unit configured to selectively store an indication representative of each corresponding address in a hash table dependent upon results of the first hash function and the second hash function; and
 a processing unit configured to determine a stack distance based upon contents of the hash table.

13. The performance monitoring mechanism of claim 12, wherein the sample control unit is configured to sample each of the results of the first hash function to determine whether to store an indication representative of a corresponding address in the hash table.

14. The performance monitoring mechanism of claim 13, wherein the sample control unit is configured to store an indication representative of a corresponding address in the hash table for at least a subset of the corresponding addresses, wherein the sample control unit is configured to randomly determine the subset of the corresponding addresses based on sampling criteria.

15. The performance monitoring mechanism of claim 14, wherein, in response to the sample control unit determining that an indication representative of a corresponding address is to be stored in the hash table, the sample control unit is further configured to determine a storage location in the hash table for the indication representative of the corresponding address based on the results of the second hash function.

16. The performance monitoring mechanism of claim 15, wherein the hash table includes a plurality of storage locations, each storage location configured to store an indication representative of a corresponding address.

17. The performance monitoring mechanism of claim 16, wherein the processing unit is configured to determine the number of storage locations in the hash table including an indication representative of a corresponding address.

18. The performance monitoring mechanism of claim 17, wherein the processing unit is configured to determine a stack distance 'd' based upon a determined number of storage locations 'x' including an indication representative of a corresponding address in a hash table of size 'tablesize', wherein the processing unit is configured to determine the stack distance 'd' as follows:

$$est(0) = 0, \text{ and for all } x > 0: est(d) = \frac{\left(d - \sum_{x=0}^{d-1}(prob(d, x)est(x))\right)}{prob(d, d)}$$

where: $prob(0, 0) = 1$, $prob(1, 1) = 1$, and for all $d > 1$: $prob(d, x) =$ $$\left(\frac{x}{tablesize}\right)prob(d-1, x) + \left(1 - \frac{x-1}{tablesize}\right)prob(d-1, x-1)$$

19. The performance monitoring mechanism of claim 18, wherein, if a sampling factor is used to determine the subset of the corresponding addresses, the processing unit is further configured to multiply a determined stack distance 'd' by the sampling factor to determine a stack distance when a particular sampling factor is used.

20. The performance monitoring mechanism of claim 12, wherein the processing unit is configured to execute a software program, wherein during execution of the software program the hashing unit is configured to receive the plurality of memory references each including a corresponding address to determine a stack distance histogram for the software program.

* * * * *